United States Patent
Le Moan

(10) Patent No.: US 10,721,229 B2
(45) Date of Patent: Jul. 21, 2020

(54) METHOD FOR ASSOCIATING AN OBJECT WITH A USER, DEVICE, OBJECT, AND CORRESPONDING COMPUTER PROGRAM PRODUCT

(71) Applicant: SIGFOX, Labege (FR)

(72) Inventor: Ludovic Le Moan, Pin Justaret (FR)

(73) Assignee: SIGFOX, Labege (FR)

( * ) Notice: Subject to any disclaimer, the term of this patent is extended or adjusted under 35 U.S.C. 154(b) by 226 days.

(21) Appl. No.: 15/539,674

(22) PCT Filed: Dec. 30, 2015

(86) PCT No.: PCT/FR2015/053774
§ 371 (c)(1),
(2) Date: Jun. 24, 2017

(87) PCT Pub. No.: WO2016/108032
PCT Pub. Date: Jul. 7, 2016

(65) Prior Publication Data
US 2017/0366544 A1    Dec. 21, 2017

(30) Foreign Application Priority Data
Dec. 31, 2014  (FR) .................................. 14 63503

(51) Int. Cl.
*G06F 7/04* (2006.01)
*H04L 29/06* (2006.01)
(Continued)

(52) U.S. Cl.
CPC .......... *H04L 63/0876* (2013.01); *G08C 17/02* (2013.01); *H04W 12/06* (2013.01);
(Continued)

(58) Field of Classification Search
CPC .. H04W 12/06; H04W 12/08; H04L 63/0876; G06F 16/903; G06F 17/30964
(Continued)

(56) References Cited

U.S. PATENT DOCUMENTS 8,346,953 B1 *  1/2013  Hew ...................... H04L 63/10
                                                      709/201
8,370,168 B1    2/2013  Jenkins et al.
(Continued)

FOREIGN PATENT DOCUMENTS

JP        2005055728 A     3/2005
JP        2011018956 A     1/2011
(Continued)

*Primary Examiner* — Gary S Gracia
(74) *Attorney, Agent, or Firm* — Im IP Law; Chai Im; C. Andrew Im

(57) ABSTRACT

A method for associating a communicating object with at least one user. A remote server receives a signal requesting an association between an user identifier and an object identifier. The server verifies an authorization for the association between the object identifier and the user identifier, including verification of whether or not there is pre-existing association of the object identifier with at least one other user identifier. If association is authorized, the object identifier is associated with the user identifier in a database which can be accessed by the remote server. The database includes at least one user identifier list and one object identifier list.

14 Claims, 2 Drawing Sheets

(51) Int. Cl.
*G08C 17/02* (2006.01)
*H04W 12/06* (2009.01)
*H04W 12/08* (2009.01)
G06F 15/16 (2006.01)
G06F 16/903 (2019.01)

(52) U.S. Cl.
CPC ........... H04W 12/08 (2013.01); *G06F 16/903* (2019.01); *G08C 2201/20* (2013.01); *G08C 2201/30* (2013.01); *G08C 2201/60* (2013.01)

(58) Field of Classification Search
USPC .................................. 726/1, 4, 5, 10; 455/36
See application file for complete search history.

(56) References Cited

U.S. PATENT DOCUMENTS

| | | | | |
|---|---|---|---|---|
| 10,142,353 | B2* | 11/2018 | Yadav | H04L 43/04 |
| 2005/0144019 | A1* | 6/2005 | Murakami | G06F 21/10 |
| | | | | 705/59 |
| 2008/0109881 | A1* | 5/2008 | Dasdan | G06F 16/955 |
| | | | | 726/4 |
| 2008/0287062 | A1 | 11/2008 | Claus et al. | |
| 2009/0009337 | A1* | 1/2009 | Rofougaran | G06K 7/10237 |
| | | | | 340/572.7 |
| 2010/0070377 | A1* | 3/2010 | Williams | G06Q 20/06 |
| | | | | 705/26.1 |
| 2013/0157562 | A1* | 6/2013 | Urard | H04W 12/003 |
| | | | | 455/39 |
| 2013/0212650 | A1* | 8/2013 | Dabbiere | H04L 63/10 |
| | | | | 726/4 |
| 2013/0247144 | A1* | 9/2013 | Marshall | H04L 63/10 |
| | | | | 726/1 |
| 2014/0082707 | A1* | 3/2014 | Egan | H04L 63/0853 |
| | | | | 726/5 |
| 2014/0207941 | A1* | 7/2014 | McCann | H04L 61/2076 |
| | | | | 709/224 |
| 2014/0259116 | A1* | 9/2014 | Birk | G06F 21/31 |
| | | | | 726/4 |
| 2014/0282897 | A1* | 9/2014 | Stuntebeck | H04L 63/08 |
| | | | | 726/4 |
| 2015/0007317 | A1* | 1/2015 | Jain | H04L 63/0227 |
| | | | | 726/23 |
| 2015/0113627 | A1* | 4/2015 | Curtis | H04W 12/06 |
| | | | | 726/10 |
| 2016/0036837 | A1* | 2/2016 | Jain | H04L 63/1416 |
| | | | | 726/23 |

FOREIGN PATENT DOCUMENTS

| | | |
|---|---|---|
| JP | 2014078903 A | 5/2014 |
| WO | 2013/068559 A1 | 5/2013 |

* cited by examiner

METHOD FOR ASSOCIATING AN OBJECT WITH A USER, DEVICE, OBJECT, AND CORRESPONDING COMPUTER PROGRAM PRODUCT

RELATED APPLICATIONS

This application is a § 371 application from PCT/FR2015/053774 filed Dec. 30, 2015, which claims priority from French Patent Application No. 14 63503 filed Dec. 31, 2014, each of which is incorporated herein by reference in its entirety.

TECHNICAL FIELD

The present invention relates to the field of communications with objects referred to as communicating or connected objects, and relates more precisely to a method for associating such an object with a user.

BACKGROUND OF THE INVENTION

A communicating or connected object is equipped with means of communication, generally wireless means, allowing it to exchange data with for example other connected objects, a dedicated central control unit or else a user terminal such as a computer, a tablet or a smartphone. These objects may for example be consumer objects such as a television set, a lamp, a smoke detector, all equipped with means of wireless communication, or else objects designed for the industrial sector such as sensors or control devices, all also equipped with suitable means of communication.

All these objects are generally capable of sending and of receiving information on their state, either in real time or otherwise, or of being requested to perform various actions. For example, in a home automation application, it is possible to remotely control the opening or the closing of blinds, to adjust the heating according to the desired temperature in a room, to switch lights on or off, to measure the quantity of electrical energy consumed, to detect the presence of smoke or of an individual in a room and to communicate this information to a terminal or to a central control unit.

Generally, the prior implementation of a method of association (commonly referred to as "pairing") allows the terminal to be associated with objects with which it is permitted to communicate, in such a manner as to indicate to the terminal, respectively to the objects, with which object, respectively terminal, it is permitted to communicate. Conventionally, the association protocol is defined by the manufacturer of the connected object or by one of the existing radio communications standards (Bluetooth, Wi-Fi, etc.). For example, the method of association may involve the exchange of an association code between the devices to be associated or the learning by each device of an identifier of the device with which it is authorized to communicate.

In view of the diversity of the communications standards and of the increasing number of manufacturers of connected objects, in order to associate several objects with one terminal, it is therefore necessary to ensure that the terminal is equipped with the various appropriate means of radio communications for establishing a dialog with each of these objects, and with the various applications dedicated to the control of each of these objects.

Furthermore, some association procedures may prove to be tedious given that the user sometimes has to input a code formed of a long series of numbers and/or letters several times. In addition, certain association protocols require manual operations on the object itself. For example, it is sometimes necessary to push a button on the object according to a particular sequence. Or, in certain cases, the object may be localized in a place which is difficult to access, or even inaccessible to the user, rendering the pairing complicated or impossible.

The use of a central control unit allows an automatic association with the connected objects from the same manufacturer. However, this solution has certain drawbacks since the diversity, together with the number of objects able to be paired with the central control unit, are limited. Furthermore, the maximum distance allowed between each object and the central control unit is sometimes limited to tens or hundreds of meters.

OBJECT AND SUMMARY OF THE INVENTION

The aim of the present invention is therefore to overcome the aforementioned drawbacks by notably providing a different solution in which the object is no longer associated with a specific device, but with a user. In particular, the present invention provides a solution for associating a user with a communicating object, which does not require complex manual operation or configuration steps to be performed by the user. Furthermore, the aim of the invention is also to provide a solution which enables the range of the communications between a terminal of the user and the communicating object to be broadened, and which does not limit either the number of connected objects that can be associated with a user, or the number of users that can be associated with a connected object.

For this purpose, one subject of the present invention is a method of association between a communicating object and at least one user. This method of association notably comprises:

the receipt by a remote server of a signal for requesting association between an identifier of the user called "user identifier" and an identifier of the object called "object identifier";

the verification by the server of an authorization for association between the object identifier and the user identifier;

if the association is authorized, the association of the object identifier with the user identifier in a database accessible by the remote server, this database comprising at least one list of user identifiers and one list of object identifiers.

Thus, the method of association of the invention is carried out by a remote server having access to a database in which user identifiers and object identifiers are stored. In particular, the remote server firstly ensures that the association is authorized, and associates the object identifier with the user identifier in the database, notably by updating the database. It goes without saying that, depending on the requests for association and on the authorizations for association, an object identifier stored in the database may therefore be associated with no, one or several user identifier(s) stored in this database.

It will therefore be understood that a successful association results in the association, in the database, of an object identifier recorded in this database with a user identifier also recorded in this database. This association defines a relationship between the object and the user which authorizes the object to communicate only with the user with which it is associated, either directly or via the server. In practice, when the server operates as an intermediary between the object and the user, the association indicates to the server having received messages from the object to which user(s) these messages are to be relayed, and the user(s) associated with this object can communicate with this object via the server.

Thus, in contrast to the prior art where the object is associated with one particular device, the method of association provided by the present invention allows an object to be associated with a user or a user account, via a user identifier. In other words, the object is no longer associated with a user terminal or a specific central control unit, but with a user via his/her user identifier. The user can thus use various terminals to communicate with the object, without it being necessary to firstly carry out the association of the object with each of these terminals. Furthermore, in contrast to the prior art where the association is generally carried out directly between an object and a user terminal or a dedicated central control unit, the method of association provided by the present invention involves the use of a remote server having access to a database. The remote server which may be affiliated with at least one wireless communications network of course comprises all the resources needed for establishing a communication at the same time with the user terminal and the communicating object. The server notably performs all the necessary verifications in order to avoid any bogus request for association, and keeps updated a table of association containing the list of the associations between the object identifiers and the user identifiers. The association between a communicating object and a user, or more precisely between an object identifier and a user identifier or a user account, is therefore carried out by the server in a manner that is virtually transparent for the user. Indeed, the user just needs to send to the server, via a terminal for example, a signal for requesting association notably containing the object identifier and the user identifier to be associated with this object identifier.

This solution notably offers the advantage of allowing a centralized association that is simple but nonetheless secure between several user identifiers and several object identifiers of various types, which may for example originate from different manufacturers, and which may for example be designed for different applications. For example, the same server may be used for associating the same user identifier with various communicating objects, mobiles or otherwise. Moreover, the user, or more exactly the terminal with which the user communicates, and the objects associated with this user, may be spread out over different geographical areas, for example separated by several kilometers between one another. The distance between the communicating objects and the user is not therefore a limiting criterion.

In addition, it is no longer necessary to assign significant resources in the user terminal and/or in the communicating objects, since the vast majority of the tasks hungry for resources, such as the method of association and the management of the communications between terminal and objects, can be implemented by the server.

In practice, in order to eliminate any bogus request of association, the verification by the server of an authorization for association may comprise:
the verification of a pre-existing association or not of the object identifier with at least one other user identifier; and
if the result of the verification of a pre-existing association is positive, the transmission by the server of a signal requesting authorization for association to a terminal associated with the other user identifier.

In this case, the association of the user identifier with the object identifier is authorized if the result of the verification of pre-existing association is negative or upon receipt of an authorization signal subsequent to the signal requesting authorization for association.

It is also possible, according to another example, not to authorize the association when the result of the verification of pre-existing association is positive, in which case the server does not send a signal requesting authorization for association and the association of the user identifier with the object identifier is only authorized if the result of the verification of pre-existing association is negative.

According to one variant, the verification of pre-existing association may consist in searching the database to see whether the object identifier is associated with another user identifier. In other words, the server verifies in the database whether the object has already been associated with another user identifier.

According to another variant, the verification of pre-existing association may consist in:
sending a state request signal to the object via a wireless communications protocol, where this wireless communications protocol may advantageously be a low-rate signal (in other words with a data rate of less than 1 kb/s); and
receiving a state signal originating from the object subsequent to the state request, this state signal containing at least one indicator of pre-existing association.

In practice, the state request sent by the server notably allows it to be known, on the one hand, whether the object is active, in other words switched on or in operation, and on the other hand, whether the object has already been associated with another user. In particular, upon receiving the state request, the object preferably sends a signal to the remote server in the form of a frame containing an indicator, for example a "flag", indicating whether the object has already been associated beforehand.

Of course, this state signal may also contain other information such as for example the identifier of the other user with which it is already associated, or again the various pieces of information needed for the server to communicate with this other user, such as information relating to the terminal to which the messages are to be sent. This is notably useful when this other user is not recorded in the database to which the server has access.

Furthermore, the frame may also contain other information useful to the remote server for carrying out the association, such as for example association criteria, the maximum number of users that may be associated, the period of time during which an association remains valid, instructions for authorizing the association.

It is of course possible to combine both variants in order to reinforce the control of bogus requests for association.

In practice, the method may furthermore comprise the transmission by the server of a signal indicating the success or failure of the association requested, to at least one terminal of the user.

Once the association has succeeded, the server may send a configuration signal to the object, according to the low-rate wireless communications protocol for example. This configuration signal may contain at least one command for updating the indicator of association, subsequent to the success of the association requested between the user identifier and the object identifier.

Advantageously, a main or secondary user status may be assigned to each user identifier for each object identifier with which the user identifier is associated in the database. Generally speaking, the main user status preferably endows the holder with all the rights over the object and the secondary user status preferably endows the holder with all or part of the rights over the object.

The request for authorizing association is preferably sent to the other user, or more exactly to the terminal of said other user, having the status of main user.

For example, according to one variant, a new user may request the association of its user identifier with that of the object identifier already associated with a user identifier having the status of main user. In this case, the main user may, simultaneously with the transmission of the authorization for association, assign the status of secondary user to the new user and define the extent of the rights of the new user over the object in question.

According to another variant, several user identifiers may be grouped under one user account in the database so as to form a user group. In this variant, the object identifiers of the database are associated with user or user group accounts. Furthermore, in a user group, the user having the status of main user may define the statuses and rights of other users of the group for each of the objects associated with this user account.

According to another variant, the system, and in particular the server, may be configured so that, in the absence of response from the main user, a secondary user is designated as substitute main user.

Thus, irrespective of the variant implemented, the database may therefore contain, aside from the object and user identifiers, other data relating to each user for each of the objects with which the user is associated, such as for example the mode of operation of the object, the type of object, the rights, the duration of validity of the rights, the preferences of each user, such as the alarm periodicity, the IP (Internet Protocol) address or any other information relating to the terminal to which the information is to be sent.

Advantageously, the remote server provides the communication between the object and at least one user terminal referenced in the database for the user identifier with which this object is associated. In other words, each connected object communicates with the user with which it is associated via the remote server. In practice, it is advantageous for the remote server to provide all of the communications between the object and the user with which the object is associated. It is however possible to provide a direct communication between the object and the user terminal once the association has been made.

In practice, the object sends messages to the server or the terminal via a first wireless communications protocol, and the user terminal sends messages to the server via a second communications protocol. This second communications protocol may be identical to the first communications protocol but may also be different. Furthermore, the user may use a first terminal for sending the request for association to the server, then use a second terminal for communicating with the server after the association, via a third communications protocol different from or identical to the first and second communications protocols.

Preferably, the server receives the messages originating from the object via at least one base station connected both to the object via a first communications network and to the server via a second communications network.

Another subject of the invention is also a communications system comprising:
    a communicating object incorporating a module for communicating according to a first communications protocol, said object being identified by a unique object identifier;
    a user terminal coupled to a module for communicating according to a second communications protocol; and
    a remote server having access to a database, such as defined hereinbefore, and coupled to means designed to communicate with the object and the terminal.

In practice, the first communications protocol is preferably compatible with an ultra-narrow-band radio technology, allowing long-range, low-rate wireless communications, with a range of several tens of kilometers for example. "Ultra-narrow-band" is understood to mean that the width of the frequency spectrum of the signals emitted with such a radio technology is less than two kilohertz, or even less than a kilohertz.

Such an ultra-narrow-band radio technology is better known under the acronym UNB and notably uses the bands of frequencies free of rights (in other words which do not require a prior request for authorization from the authorities) for transmitting data destined for or originating from connected equipment over a very narrow spectrum. It notably allows low-rate wireless radio communications (typically of the order of 10 b/s to 1 kb/s) over long distances (notably 35 up to 40 km in free field), and is notably well adapted for low-rate network communications of the Machine-to-Machine (M2M) type or of the "Internet of Things" type. One example of communications system implementing such a UNB technology is notably described in the international patent application published under the number WO 2013/068559.

Accordingly, the object is therefore preferably integrated into a first communications network conforming to this long-range, low-rate wireless communications technology, referred to as Ultra Narrow Band.

Furthermore, the user terminal may be any type of equipment coupled to hardware and/or software means for communicating with the remote server according to at least one communications protocol. Such a terminal may be fixed or mobile, and may for example take the form of a mobile station, of a computer, of a mobile telephone, of a smartphone, of a tablet, of a card, etc. The hardware and/or software means may be integrated directly into the terminal or may be external modules connected to the terminal, via for example a connection conforming to the USB (acronym for "Universal Serial Bus") standard. For example, these hardware and/or software means may take the form of a hardware key (commonly known as a "dongle") composed of integrated circuits coupled to a radio antenna compatible with one of the wireless radio communications technologies. These hardware and/or software means may also be a network card compatible with one of the existing communications technologies. For example, the user terminal communicates with the remote server according to a communications protocol compatible with one of the existing radio communications standards, which may be wireless or wired, such as for example Ethernet, the IEEE 802.11 group standards (Wi-Fi), IEEE 802.15 (Bluetooth, ZigBee), IEEE 802.16 (WiMAX), RFID, CPL, NFC (near-field communications technology), or again is compatible with said long-range, low-rate communications technology, of the UNB type.

Accordingly, the terminal may be affiliated with a second communications network, distinct from the first communications network.

Preferably, the communications between the objects and the server, or between the user terminals and the server, preferably transit via at least one base station of a low-rate wireless communications network with which the server is affiliated.

A further subject of the invention is an association device comprising a remote server having access to a database, said database comprising at least one list of user identifiers and a list of object identifiers. The server is capable of communicating with at least one remote object according to a communications protocol and with at least one remote terminal. The server is furthermore capable of implementing the method of association defined hereinabove. The communications protocol between the server and the object may be, without this being limiting, a low-rate wireless communications protocol, for example compatible with a UNB radio technology.

The invention also relates to a communicating object identified by a unique object identifier, comprising:
- means of communication according to a low-rate wireless communications protocol;
- means for responding to all or part of the requests of the method of association described hereinabove.

A suitable user terminal may notably comprise:
- means for obtaining an identifier from an object referred to as "object identifier";
- means for sending a request for association of said object identifier with an identifier of the user, referred to as "user identifier", to a remote server;
- means for responding to all or part of the requests from the method of association described hereinabove.

The invention also relates to a computer program product downloadable from a communications network and/or recorded on a media readable by computer and/or executable by a processor, comprising program code instructions for the implementation of all or part of the method of association described hereinabove.

BRIEF DESCRIPTION OF THE DRAWINGS

Other features and advantages of the invention will become more clearly apparent from its description presented hereinafter, by way of example and in no way limiting, with reference to the appended drawings, in which.

DETAILED DESCRIPTION OF ONE PARTICULAR EMBODIMENT

Figure 1:
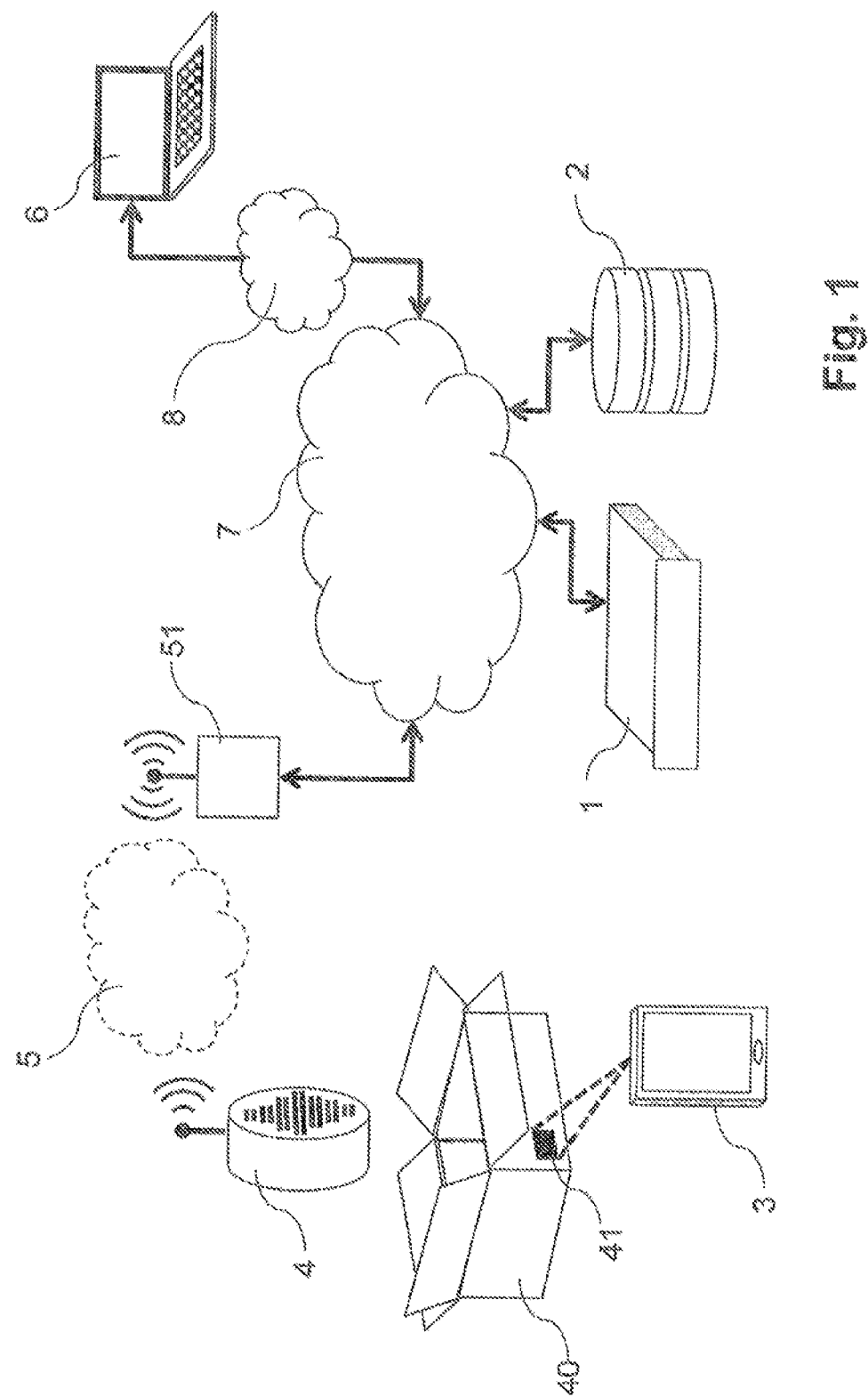
FIG. 1 is a schematic representation of a communications system implementing a method of pairing according to one embodiment of the invention.

With reference to FIG. 1, a communications system designed for the implementation of the pairing according to one particular embodiment notably comprises:
- a remote server 1 having access to a database 2;
- a first user terminal 3; and
- a communicating object 4.

In this particular embodiment, the remote server 1 is notably affiliated, in other words connected via a global communications network 7, with a first communications network 5. This first communications network is preferably of the wireless type and preferably of the low-rate type, for example compatible with UNB radio technology. In practice, the messages sent by the server to the first network 5 are relayed via a base station 51 connected both to the global network 7, for example of the internet type or of the GSM type, and to the first network 5. Accordingly, the server 1 and the base station 51 therefore comprise all the hardware and software means for communicating via the network(s) to which they are connected.

Furthermore, the communicating object 4 and the first user terminal 3, for example a smartphone or, alternatively, a tablet or a computer, are also equipped with hardware and software means for connecting to the first network 5 and communicating via this first communications protocol.

The communicating objects in question, in this particular case, are of the type of those that allow what is referred to as the "Internet of Things" to be formed, namely a connected physical network of objects carrying a certain amount of information and capable of communicating it. Such communicating objects correspond to a wide diversity of devices, such as for example cardiac implants, biocompatible transponders, automobile vehicles with various on-board sensors, information acquisition devices such as for example water or electricity consumption meters, smoke detectors, actuators controlling various devices such as street lighting or the opening of a gate, connected thermostats, remote control washing machines, etc.

Thus, a communicating object may be an object equipped with means for interacting with its environment, in the form of sensors and/or of actuators for example, and with means for exchanging information with terminals or others communicating objects, in the form of a communications module, typically wireless. For example, such a communicating object may be capable:
- of acquiring information relating to its own actual state or to its environment via sensors for example,
- of processing and storing information,
- of exchanging information with a terminal or any other communicating object via a communications module, typically wireless, for example for sending the information acquired or for receiving commands,
- of performing actions on its own actual state or on the environment via actuators for example.

Typically, the communicating object 4 is identified by an object identifier, which may be contained within a code 41 such as a bar code, a two-dimensional code of the "flash-code" or "QR code" type, or else an alphanumerical code. For example, this object identifier may be affixed by the manufacturer directly onto the object 4 or printed on the packaging 40 of the object or in a user instruction sheet. It goes without saying that the code 41 containing the object identifier may also contain other information relating to the object.

Similarly, each user is identified by the server 1 by a user identifier, for example in the form of a login coupled with a password. Furthermore, several users may be grouped under the same user account.

The database 2 accessible by the server 1, either directly or via the global network 7, notably comprises a list of pre-recorded user identifiers and, potentially, a list of pre-recorded object identifiers. Furthermore, the database 2 may also be enhanced by complementary information relating to each user identifier and/or each object identifier, such as for example the type of object, the date of acquisition of the object, information relating to the warranty, or else the preferences of use for each of the users, such as for example the IP address to which the messages must be sent, the electronic address, the telephone number, etc. Among this complementary information may also be mentioned the status of the user for each of the objects with which it is associated. For example, a main or secondary user status may be assigned to each user identifier for each object identifier with which this user identifier is associated in the database. Generally, the status of main user endows the holder with all the rights over the object and the status of secondary user endows the user with all or part of the rights over the object.

Figure 2:
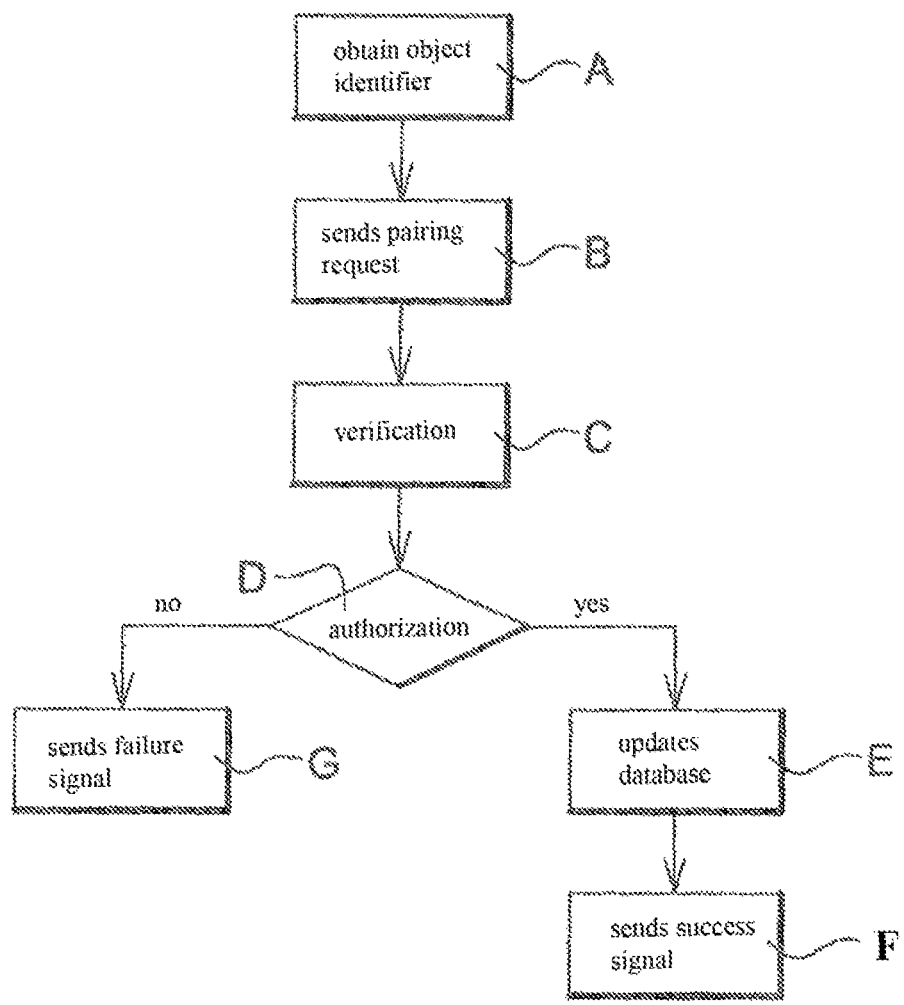
FIG. 2 shows, by way of illustration, a flow diagram of the pairing method implemented by the communications system illustrated in FIG. 1.

FIG. 2 shows a flow diagram summary of the main steps implemented during the pairing of an object identifier with a user identifier, appropriate to the communications system in FIG. 1.

As a first step, the user obtains (step A) the object identifier of the object, for example manually or automatically via the first user terminal 3. For example, the terminal 3 may be equipped with a flashcode reader.

Subsequently, the user sends (step B), via the first user terminal 3, a request for association to the server 1. This request for association notably takes the form of a frame containing, in particular, the object identifier of the object and the user identifier to be associated with this object. It goes without saying that this frame may contain other information relating to the user and/or the object like that contained in the bar code containing the object identifier for example.

In practice, the transmission of this frame may be carried out via an application installed in the first terminal 3. For example, the user can manually enter the user identifier and the object identifier via an interface for this application. In one variant, the application may be designed in such a manner as to allow the automatic input of the code containing the object identifier, for example via a bar code reader, and to allow the automatic transmission of the pairing request to the server.

When the server 1 receives the pairing request, the server 1 verifies (step C) whether the association requested is authorized, with the aim of eliminating any bogus request for association.

In practice, the server 1 verifies whether the object identifier is already associated with another user identifier.

For example, the server 1 can verify whether the object identifier is recorded in the database 2 and whether the object identifier is already associated with another user identifier.

It is of course possible that the object identifier might not be recorded in the database 2 prior to the pairing request. In this case, the object identifier will be added to the database during the association procedure, and the verification of the authorization for association may be obtained by sending a state request signal to the object via the first communications protocol. When this state request signal is received, the object 4 sends a state signal in the form of a frame notably containing an indicator of pre-existing association. Aside from this indicator of pre-existing association, the frame may also contain other types of information, for example the identifier of the main user of the object, the maximum number of users that can be associated, an indicator stating whether a new association is authorized.

According to one variant, the indicator of pre-existing association may be directly contained in the request for association. For example, it is possible to envision the case where the object is itself capable of generating an updated code, for example a bar code, containing not only the object identifier but also the updated information relating to the pre-existing association which could be sent automatically during the request for association. Of course, if the object 4 is already associated with another user, the code generated by the object may also contain the identifier of this other user. Moreover, when the object 4 is associated with several others users, it is preferable for the user identifier contained in the code to correspond to a user identifier having the status of main user.

Whatever the solution envisioned, if the result of the verification of a pre-existing association is negative, the association of the user identifier with the object identifier is therefore authorized, and the server 1 accordingly updates the database 2 (step E) for associating the object identifier with the user identifier.

In contrast, if the result of the verification of a pre-existing association is positive, in the example illustrated in FIG. 2, the server 1 sends a signal requesting authorization for association to a terminal 6 associated with this other user identifier (step D). The communication between the server 1 and the terminal 6 of this other user may conform to the first communications protocol or conform to another communications protocol.

In the case illustrated in FIG. 1, the server 1 communicates with the terminal 6 of the other user via a second communications protocol, different from the first communications protocol. The remote server 1 is therefore also affiliated with a second communications network 8, compatible with one of the existing communications standards, for example WI-FI®, and hence also comprises all the hardware and software means for communicating via this second communications protocol.

When a signal is received for authorizing association coming from the terminal 6 of this other user, the server 1 carries out the association of the user identifier with the object identifier by updating the database 2 (step E).

Once the association has been made in the database 2, the server 1 sends (step F) a signal indicating the success of the association requested to the first user terminal 3.

Of course, if the authorization for association is negative, the server does not implement the pairing and sends (step G) a signal indicating the failure of association requested to the first terminal 3 of the user having requested the association.

Furthermore, subsequent to the success of the association, the server 1 may also send a configuration signal to the object 4 containing, for example, an instruction for updating the association indicator and potentially the user identifier having the corresponding status of main user.

Subsequently, the object 4 communicates with the user with which it is associated via the remote server 1. It is of course possible for the user to use the first terminal 3 or a second terminal, distinct from the first terminal, for communicating with the server, via the first communications protocol or via a second communications protocol.

Furthermore, the case may also readily be envisaged where the first user terminal uses a communications protocol different from the first wireless communications protocol for communicating with the server.

What has been presented hereinabove therefore demonstrates that the solution provided is a solution for pairing between an object and a user, which does not require complex manual operations or configuration steps on the part of the user. Furthermore, the constraint on the number of objects to be paired, on the number of users to be associated and on the distance between the object and the terminal no longer exists. By virtue of the invention, the communicating object may be configured so as to take into account only frames originating from the server, which allows systematic processing by the object of all the irrelevant surrounding frames to be avoided. Furthermore, the user can communicate with the object via the server using any given terminal, and this is possible even if the communications protocol supported by this terminal is incompatible with that supported by the object.

The solution of the invention is particularly suited to communicating objects of the type of those used in M2M (Machine-to-Machine) applications, or of those that allow "The Internet of Things" to be formed, and preferably incorporating means of low-rate wireless communication compatible with UNB technology.

The invention claimed is:

1. A method to associate a communicating object with at least one user, comprising:
   a reception of a signal requesting association between a first user identifier uniquely associated with a first user associated with a first user terminal and an object identifier by a remote server;
   a verification to determine whether a pre-existing association of the object identifier with a second user identifier uniquely associated with a second user exists by the remote server, the second user identifier being different from the first user identifier; an authorization to associate the object identifier and the first user identifier in response to a determination that no pre-existing association of the object identifier exists; and an association of the object identifier with the first user identifier in a database accessible by the remote server in response to a determination that the association is authorized, the database comprising at least one list of user identifiers, one list of object identifiers and one list of authorized associations between an object identifier and a user identifier,
   wherein, in response to a determination that the result of the verification of a pre-existing association is positive, the remote server sends a signal requesting authorization for association to a second user terminal associated with the second user identifier, wherein the communication between the remote server and the second user terminal of the second user conforms a second communications protocol, different from a first communications protocol; and
   when a signal is received for authorizing association coming from the second user terminal of the second user, the remote carries out the association of the first user identifier with the object identifier by updating the database, wherein once the association has been made in the database, the remote server sends a signal indicating the success of the association requested to the first user terminal.

2. The method as claimed in claim 1, further comprising an assignment of a main or secondary user status to each user identifier for each object identifier with which said each user identifier is associated in the said database; and wherein the signal requesting authorization for association is sent to other user having a status of the main user.

3. The method as claimed in claim 2, wherein the authorization signal originating from said other user comprises a status to be assigned to said each user identifier for the communicating object.

4. The method as claimed in claim 1, wherein the pre-existing association is verified by searching the database to determine whether the object identifier is associated with the second user identifier.

5. The method as claimed in claim 1, wherein the verification of the pre-existing association comprises transmission of a state request signal to the communicating object via a wireless communications protocol; reception of a state signal originating from the communicating object subsequent to the state request signal; and wherein the state signal comprises at least one indicator of pre-existing association.

6. The method as claimed in claim 5, further comprising a transmission, by the remote server according to the wireless communication protocol to the communicating object, of a configuration signal comprising at least one command for updating an indicator of association, subsequent to a successful association between the user identifier and the object identifier.

7. The method as claimed in claim 5, wherein the wireless communications protocol is a low-rate protocol.

8. The method as claimed in claim 7, wherein the low-rate wireless communications protocol is compatible with an ultra-narrow-band radio technology.

9. The method as claimed in claim 1, further comprising an assignment of a main or secondary user status to each user identifier for each object identifier with which said each user identifier is associated in the database.

10. The method as claimed in claim 1, further comprising a communication by the communicating object with at least one terminal of each user with which the communicating object is associated via the remote server.

11. A device to associate an object with a user, comprising a remote server having access to a database, the database comprising at least one list of user identifiers and one list of object identifiers; wherein the remote server is configured to communicate with at least a remote object and a remote terminal; and wherein the remote server is configured to implement the steps of the method for associating as claimed in claim 1.

12. A communicating object identified by a unique object identifier, comprising a network connector operating according to a low-rate wireless communications protocol; and a processor to respond to all or part of requests from the method for associating as claimed in claim 1.

13. The communicating object as claimed in claim 12, wherein the low-rate wireless communications protocol is compatible with an ultra-narrow-band radio technology.

14. A computer program product recorded on a non-transitory media readable by a computer or executable by a processor, comprising program code instructions for implementing all or part of the method for associating as claimed in claim 1.

* * * * *